United States Patent
Moon et al.

(10) Patent No.: US 11,830,987 B2
(45) Date of Patent: Nov. 28, 2023

(54) ELECTROLYTE DETECTION DEVICE AND SECONDARY BATTERY TRANSFER FACILITY COMPRISING THE SAME

(71) Applicant: LG Energy Solution, Ltd., Seoul (KR)

(72) Inventors: Tae Young Moon, Daejeon (KR); Jun Hyeak Huh, Daejeon (KR)

(73) Assignee: LG Energy Solution, Ltd.

(\*) Notice: Subject to any disclaimer, the term of this patent is extended or adjusted under 35 U.S.C. 154(b) by 0 days.

(21) Appl. No.: 17/634,807

(22) PCT Filed: Aug. 13, 2020

(86) PCT No.: PCT/KR2020/010733
§ 371 (c)(1),
(2) Date: Feb. 11, 2022

(87) PCT Pub. No.: WO2021/040285
PCT Pub. Date: Mar. 4, 2021

(65) Prior Publication Data
US 2022/0328888 A1     Oct. 13, 2022

(30) Foreign Application Priority Data
Aug. 26, 2019 (KR) ................ 10-2019-0104715

(51) Int. Cl.
*H01M 10/42* (2006.01)
*H01M 10/48* (2006.01)

(52) U.S. Cl.
CPC ..... *H01M 10/4228* (2013.01); *H01M 10/484* (2013.01)

(58) Field of Classification Search
CPC .............. H01M 10/4228; H01M 10/484
See application file for complete search history.

(56) References Cited

U.S. PATENT DOCUMENTS 6,337,559 B1* 1/2002 Sato .................... H01M 50/574
320/134
2011/0316710 A1 12/2011 Dai
(Continued)

FOREIGN PATENT DOCUMENTS

CN    102680191    *  9/2012
CN    103222097 A     7/2013
(Continued)

OTHER PUBLICATIONS

KR20110053004MT (Year: 2011).*
(Continued)

*Primary Examiner* — Alexander Usyatinsky
(74) *Attorney, Agent, or Firm* — Lerner David LLP

(57) ABSTRACT

The present invention relates to an electrolyte detection device. The electrolyte detection device comprises: a contamination detection plate configured to contact any one surface of a secondary battery, in which an opening is provided; first and second conductors provided to be spaced apart from each other so that current does not flow on a surface of the contamination detection plate, the first and second conductors being electrically connected to each other by an electrolyte leaking from the opening of the secondary battery; a power member comprising a positive electrode connected to the first conductor and a negative electrode connected to the second conductor; and a contamination detection member configured to detect whether the electrolyte leaks through the current generated when the first conductor and the second conductor are electrically connected to each other.

12 Claims, 12 Drawing Sheets

(56) References Cited

U.S. PATENT DOCUMENTS

| | | | |
|---|---|---|---|
| 2013/0240323 A1 | 9/2013 | Min et al. | |
| 2013/0260211 A1* | 10/2013 | Min | B32B 37/0046 429/163 |

FOREIGN PATENT DOCUMENTS

| | | | |
|---|---|---|---|
| CN | 204085812 | * | 1/2015 |
| CN | 110459820 | * | 11/2019 |
| CN | 209570300 | * | 11/2019 |
| JP | H10012284 A | | 1/1998 |
| JP | 2001084996 A | | 3/2001 |
| JP | 2002251985 | * | 9/2002 |
| JP | 2002251985 A | | 9/2002 |
| JP | 2004200012 A | | 7/2004 |
| JP | 2008060000 A | | 3/2008 |
| JP | 2019109990 A | | 7/2019 |
| KR | 19980012695 A | | 4/1998 |
| KR | 20020032095 A | | 5/2002 |
| KR | 20110053004 | * | 5/2011 |
| KR | 20110053004 A | | 5/2011 |
| KR | 20120060700 A | | 6/2012 |
| KR | 20120131383 A | | 12/2012 |
| KR | 101397926 B1 | | 5/2014 |
| KR | 20150062257 A | | 6/2015 |
| KR | 20160143038 A | | 12/2016 |
| KR | 20180111122 A | | 10/2018 |
| WO | 2018182387 A1 | | 10/2018 |

OTHER PUBLICATIONS

JP2002251985 MT (Year: 2002).*
International Search Report for Application No. PCT/KR2020/010733 dated Nov. 19, 2020, 2 pages.

* cited by examiner

ELECTROLYTE DETECTION DEVICE AND SECONDARY BATTERY TRANSFER FACILITY COMPRISING THE SAME

CROSS-REFERENCE TO RELATED APPLICATION

The present application is a national stage entry under 35 U.S.C. § 371 of International Patent Application No. PCT/KR2020/010733, filed on Aug. 13, 2020, published in Korean, which claims priority to Korean Patent Application No. 10-2019-0104715, filed on Aug. 26, 2019, the entire contents of which are incorporated herein by reference.

TECHNICAL FIELD

The present invention relates to an electrolyte detection device and a secondary battery transfer facility comprising the same, and more particularly, to an electrolyte detection device for detecting metallic or non-metallic materials such as an electrolyte stained on a surface of a secondary battery, and a secondary battery transfer facility comprising the same.

BACKGROUND ART

In general, secondary batteries refer to chargeable and dischargeable batteries, unlike primary batteries that are not chargeable. The secondary batteries are being widely used in the fields of small and advanced electronic devices such as mobile phones, PDAs, and notebook computers.

Such a secondary battery comprises an electrode assembly and a pouch accommodating the electrode assembly, and the electrode assembly has a structure in which a plurality of electrodes and a plurality of separators are alternately stacked.

A method for manufacturing the secondary battery having the above-described structure comprises a preparation process of preparing an electrode assembly, an accommodation process of accommodating the electrode assembly in a pouch, an injection process of injecting an electrolyte into the pouch to seal the pouch, thereby manufacturing a secondary battery, and a charging/discharging process of charging and discharging the secondary battery.

Here, the secondary battery, in which the injection process is completed, is transferred to the charging/discharging process by using a jig or gripper.

However, if the electrolyte leaks out of the pouch and is stained on the surface of the secondary battery to contaminate the secondary battery when the electrolyte is injected in the injection process, defects may occur. Particularly, the jig or gripper may be contaminated by the contaminated secondary battery to cause secondary contamination.

DISCLOSURE OF THE INVENTION

Technical Problem

The present invention is invented to solve the above problems, and an object of the present invention is to provide an electrolyte detection device which is capable of detecting a secondary battery that is stained with a material having metallic and non-metallic properties such as an electrolyte, and particularly, is capable of previously preventing secondary contamination from occurring due to the contaminated secondary battery, and a secondary battery transfer facility comprising the same.

Technical Solution

An electrolyte detection device according to the present invention for achieving the above object comprises: a contamination detection plate configured to contact any one surface of a secondary battery, in which an opening is provided; first and second conductors provided to be spaced apart from each other so that current does not flow on a surface of the contamination detection plate, the first and second conductors being electrically connected to each other by an electrolyte leaking from the opening of the secondary battery; a power member comprising a positive electrode connected to the first conductor and a negative electrode connected to the second conductor; and a contamination detection member configured to detect whether the electrolyte leaks through the current generated when the first conductor and the second conductor are electrically connected to each other.

Each of the first conductor and the second conductor may be provided in plurality, and the plurality of first conductors and the plurality of second conductors may be alternately arranged to be spaced apart from each other so that the current does not flow from an upper end to a lower end of the contamination detection plate.

Both ends of the first conductor and the second conductor may be provided to match both ends of the contamination detection plate.

The first conductor and the second conductor may be arranged to be spaced an interval of 2 mm to 5 mm from each other.

The contamination detection plate may be made of a material having no liquid absorption and non-conductivity.

The first conductor and the second conductor may be alternately arranged and inserted into a plurality of insertion grooves provided in the surface of the contamination detection plate.

Outer surfaces of the first conductor and the second conductor, which are inserted into the insertion grooves, and the surface of the contamination detection plate may have the same height.

The contamination detection member may comprise a lamp configured to generate light through the current generated when the first conductor and the second conductor are electrically connected to each other.

The electrolyte detection device may further comprise an adjustment member configured to allow the first conductor and the second conductor to move in a direction toward or opposite to the opening so as to adjust positions of the first conductor and the second conductor.

The adjustment member may be provided on each of the first conductor and the second conductor, which are provided on the contamination detection plate, and be provided on a side surface of the contamination detection plate so as to be movable in the direction toward or opposite to the opening so that the first conductor and the second conductor move in the direction toward or opposite to the opening so as to be adjustable in position.

The electrolyte detection device may further comprise an absorption member configured to absorb the electrolyte leaking from the opening of the secondary battery at a lower end of the surface of the contamination detection plate.

A secondary battery transfer facility according to the present invention comprises: a gripper comprising a gripping part configured to grip both surfaces of a secondary battery having an opening in an upper portion thereof and a moving part configured to allow the gripping part configured to grip the secondary battery to move to a set position; and an electrolyte detection device installed on the moving part corresponding to an upper portion of the secondary battery to detect an electrolyte leaking from the opening of the secondary battery, wherein the electrolyte detection device comprises: a contamination detection plate installed on the moving part and configured to contact any one surface of a secondary battery, in which an opening is provided; first and second conductors provided to be spaced apart from each other so that current does not flow on a surface of the contamination detection plate, the first and second conductors being electrically connected to each other by an electrolyte leaking from the opening of the secondary battery; a power member comprising a positive electrode connected to the first conductor and a negative electrode connected to the second conductor; and a contamination detection member configured to detect whether the electrolyte leaks through the current generated when the first conductor and the second conductor are electrically connected to each other.

The electrolyte detection device may be installed on the moving part so as to be adjustable in position in a direction toward or opposite to the opening of the moving part.

The secondary battery transfer facility may further comprise an elastic member having elastic restoring force, so that the contamination detection plate elastically contacts the secondary battery, between the moving part and the contamination detection plate.

The elastic member may comprise a spring.

Advantageous Effects

The electrolyte detection device according to the present invention may comprise the contamination detection plate, the first and second conductors, the power member, and the contamination detection member. Therefore, the electrolyte stained on the outside of the secondary battery may be quickly detected to previously prevent the secondary contamination from occurring due to the contaminated secondary battery.

In addition, the electrolyte detection device according to the present invention may comprise the plurality of first and second conductors, and the plurality of first and second conductors may be alternately arranged on the contamination detection plate. Therefore, whether the electrolyte leaks, and the secondary battery is contaminated may be quickly detected on the entire surface of the secondary battery.

In addition, in the electrolyte detection device according to the present invention, the first and second conductors may be arranged to be spaced the interval of 2 mm to 5 mm from each other. That is, when the first and second conductors are arranged to be spaced the interval of 2 mm or less from each other, the first and second conductors may be connected to each other due to the bending of the secondary battery to cause the errors. When the first and second conductors are arranged to be spaced the intervals of 5 mm or more from each other, the electrolyte having the size of 5 mm or less may not be detected even though the electrolyte flows in the secondary battery. Therefore, the first and second conductors may be arranged to be spaced the interval of 2 mm to 5 mm from each other, thereby stably detecting the electrolyte that leaks out of the secondary battery.

In addition, in the electrolyte detection device according to the present invention, the contamination detection plate may be made of the material having the no liquid absorption and the non-conductivity. Therefore, the electrolyte leaking out of the secondary battery may flow without stagnation, and thus, the first and second conductors may be quickly connected to each other to quickly detect whether the secondary battery is contaminated. In addition, the first and second conductors may be prevented from being electrically connected to each other by the contamination detection plate.

In addition, in the electrolyte detection device according to the present invention, each of the first and second conductors may be inserted into the insertion groove of the contamination detection plate to prevent the electrolyte leaking from the secondary battery from being stagnated by being caught on the first and second conductors.

In addition, in the electrolyte detection device according to the present invention, the first and second conductors, which are inserted into the insertion grooves, and the surface of the contamination detection plate may be disposed at the same height, i.e., the same horizontal plane to prevent the electrolyte leaking out of the secondary battery from being inserted into the insertion grooves, thereby inducing the stable flow of the electrolyte.

In addition, the electrolyte detection device according to the present invention may be mounted on the gripper that transfers the secondary battery. Therefore, whether the electrolyte is stained on the outside of the secondary battery may be detected while the secondary battery is transferred to detect the contamination of the secondary battery and previously prevent the secondary contamination from occurring.

In addition, the electrolyte detection device according to the present invention may be coupled to the gripper so that the position of the electrolyte detection device is adjustable. Therefore, the electrolyte detection device may be interchangeably used for the secondary battery having the various sizes.

MODE FOR CARRYING OUT THE INVENTION

Figure 1:
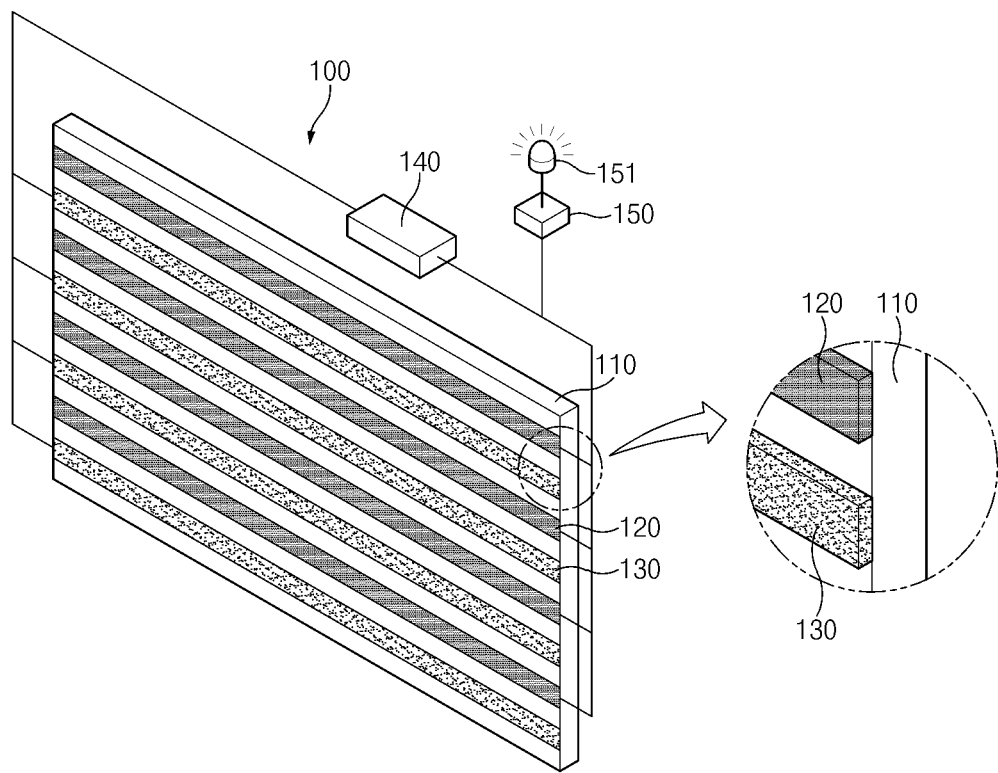
FIG. 1 is a perspective view of an electrolyte detection device according to a first embodiment of the present invention.
Figure 2:
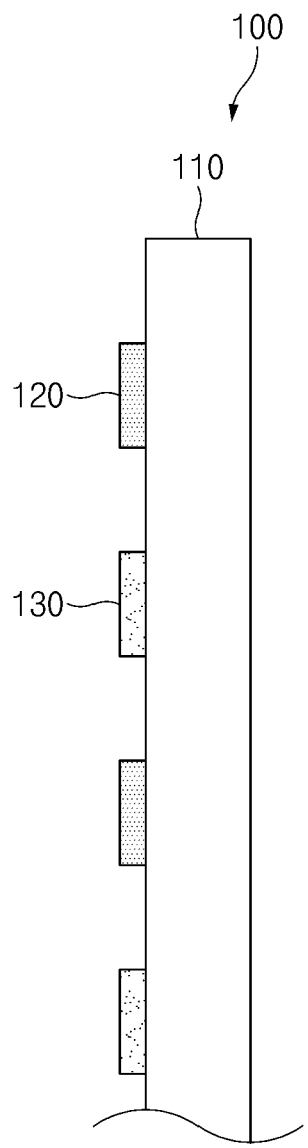
FIG. 2 is a side view of the electrolyte detection device according to the first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Secondary Battery]

A secondary battery 10 comprises an electrode assembly, an electrolyte, and a pouch 11 accommodating the electrode assembly and the electrolyte. Here, the pouch 11 comprises an opening 11a, which is opened upward, and the electrode assembly and the electrolyte are accommodated in the pouch 11 through the opening 11a.

In the secondary battery 10, when the electrolyte is injected through the opening 11a of the pouch 11, a phenomenon in which the electrolyte overflows out of the opening 11a of the pouch 11 due to an excessive injection of the electrolyte or an external impact, i.e., leakage of the electrolyte may occur. As a result, the electrolyte may be stained on an outer circumference of the secondary battery to contaminate the secondary battery. Particularly, normal secondary batteries and a secondary battery transfer facility may be contaminated by the contaminated secondary battery to cause a secondary contamination accident.

An electrolyte detection device according to the present invention may previously detect the contaminated secondary battery to previously prevent secondary contamination due to the contaminated secondary battery from occurring. Hereinafter, the electrolyte detection device according to the present invention will be described in more detail.

Electrolyte Detection Device According to First Embodiment of the Present Invention As illustrated in FIGS. 1 to 4, an electrolyte detection device 100 according to a first embodiment of the present invention is configured to detect an electrolyte leaking and flowing out of a pouch of a secondary battery and comprises a contamination detection plate 110 contacting the pouch 11 of the secondary battery 10, first and second conductors 120 and 130 disposed to be spaced apart from the contamination detection plate 110, a power member 140 comprising a positive electrode connected to the first conductor 120 and a negative electrode connected to the second conductor 130, and a contamination detection member 150 detecting whether the electrolyte leaks through current generated while the first conductor 120 and the second conductor 130 are electrically connected to each other.

Contamination Detection Plate

The contamination detection plate 110 is provided with the first and second conductors and has the same shape as a surface of the pouch 11. Particularly, a contact surface of the contamination detection plate contacting the pouch 11 may be formed as a horizontal plane, and thus, the pouch 11 and the contamination detection plate 110 may be in surface close contact with each other.

When the pouch 11 is provided with an electrode assembly accommodation part and gas pocket part, the contamination detection plate 110 has the same shape as the gas pocket part to contact a surface of the gas pocket part.

The contamination detection plate 110 may be made of a material having no liquid absorption to prevent the electrolyte leaking out of the pouch 11 from being absorbed into the contamination detection plate. Also, the contamination detection plate 110 may be made of a non-conductive material to prevent current from flowing through the first and second conductors 120 and 130 by the contamination detection plate 110. Also, the contamination detection plate 110 may be made of a transparent or translucent material to visually confirm whether the electrolyte leaks onto the surface of the pouch 11 through the translucent detection plate 110.

First and Second Conductors

The first and second conductors 120 and 130 are disposed to be spaced apart from each other so that the current does not flow on the surface of the contamination detection plate 110 and has a structure in which the current flows by the electrolyte leaking from the opening of the secondary battery.

That is, the first and second conductors 120 and 130 may be formed in the form of a plurality of bars. The plurality of first conductors 120 and the plurality of second conductors 130 are alternately arranged to be spaced apart from each other so that the current flows from an upper end to a lower end of the contamination detection plate 110.

As described above, when the electrolyte does not exist on the outer surface of the pouch 11, the current does not flow through the first and second conductors 120 and 130. When the electrolyte is stained on the outer surface of the pouch 11, the first and second conductors 120 and 130 may be connected to each other by the electrolyte so that the current flows.

Both ends of the first and second conductors 120 and 130 are provided to match both ends of the contamination detection plate 110 to detect whether the contamination due to the electrolyte occurs up to both the ends of the contamination detection plate.

The first conductor 120 and the second conductor 130 are arranged to be spaced an interval of 2 mm to 5 mm from each other. That is, when the first conductor 120 and the second conductor 130 are arranged to be spaced the interval of 2 mm or less from each other, the first and second conductors may be connected to each other due to the bending of the secondary battery to cause the errors. When the first and second conductors are arranged to be spaced the intervals of 5 mm or more from each other, the electrolyte having the size of 5 mm or less may not be detected even though the electrolyte is stained on the secondary battery. Therefore, the first and second conductors may be arranged to be spaced the interval of 2 mm to 5 mm from each other, thereby stably detecting the electrolyte that leaks out of the secondary battery.

Power Member

The power member 140 is configured to supply the current to the first and second conductors. A positive electrode is connected to the first conductor 120, and a negative electrode is connected to the second conductor 130. Here, although the power member 140 is connected to the first and second conductors, since the first and second conductors 120 and 130 are spaced apart from each other, the current does not flow.

Contamination Detection Member

The contamination member 150 is configured to detect the electrolyte leaking out of the pouch and is provided on a connection line between the first conductor 120 and the power member 140 or a connection line between the second conductor 130 and the power member 140 to detect whether the electrolyte leaks through the current generated when the first conductor 120 and the second conductor are electrically connected to each other. That is, the contamination detection member 150 operates by the current generated when the first conductor 120 and the second conductor 130 are electrically connected to each other to generate an electrolyte detection signal.

The contamination detection member 150 comprises a lamp 151 that generates light as the electrolyte detection signal. The lamp 151 generates light through the current generated when the first conductor and the second conductor are electrically connected to each other to easily notify whether the electrolyte leaks.

Thus, the electrolyte detection device 100 according to the first embodiment of the present invention may quickly detect the electrolyte stained on the outside the pouch to previously prevent secondary battery due to the contaminated secondary battery from occurring.

Hereinafter, an operating state of the electrolyte detection device 100 according to the first embodiment of the present invention will be described.

Figure 3:
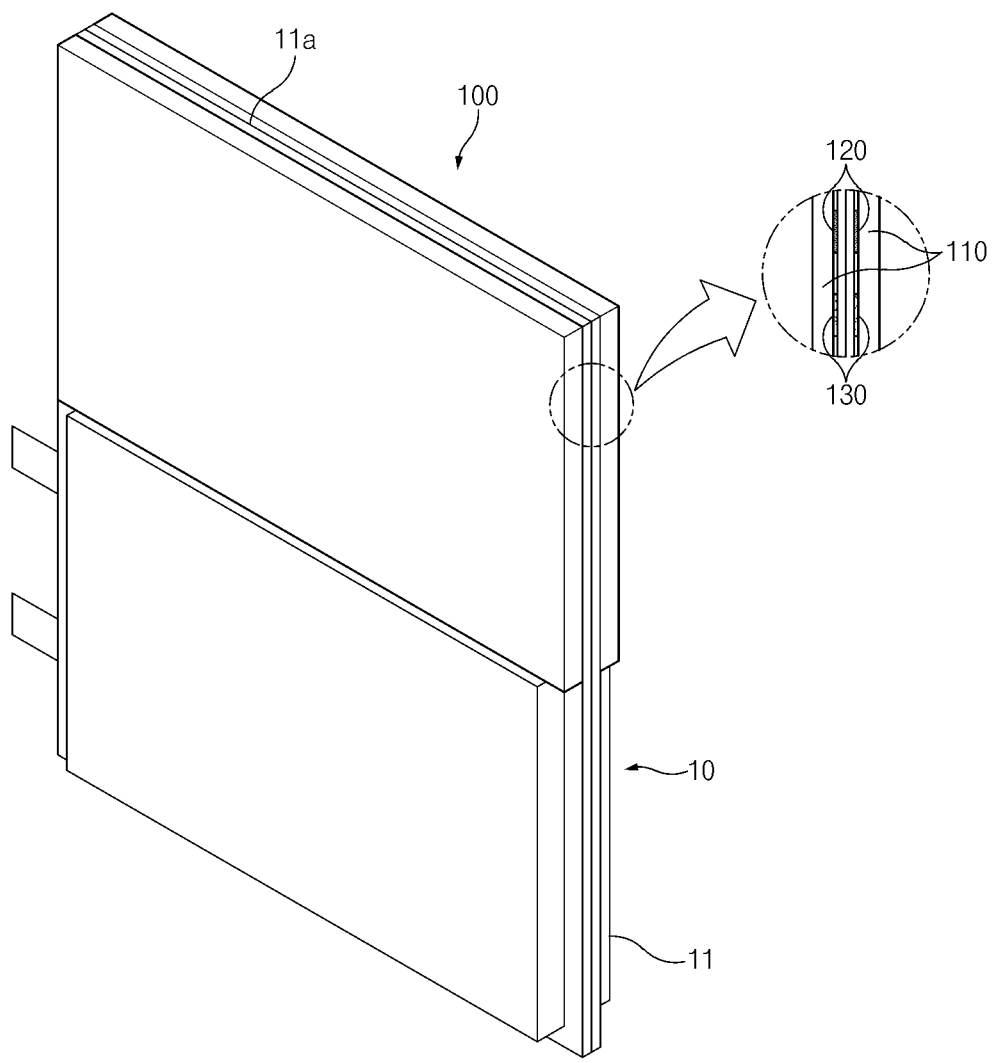
FIG. 3 is a perspective view of a secondary battery for which the electrolyte detection device is used according to the first embodiment of the present invention.
Figure 4:
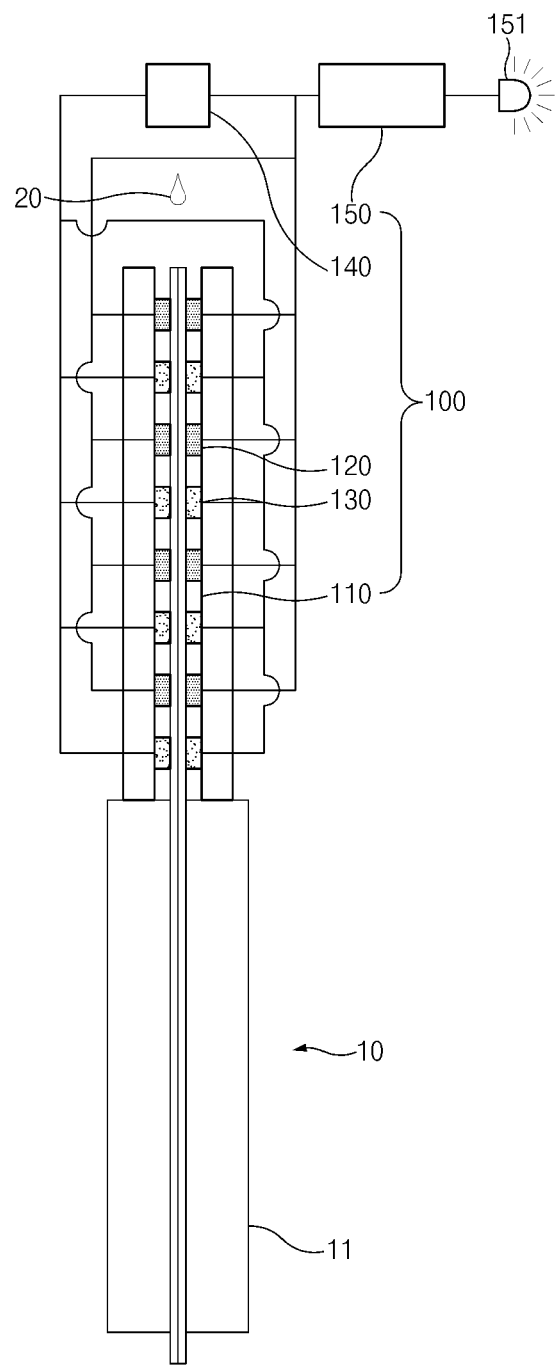
FIG. 4 is a side view of the secondary battery for which the electrolyte detection device is used according to the first embodiment of the present invention.

As illustrated in FIGS. 3 and 4, the contamination detection plate 110 of the contamination detection device 100 is in contact with the pouch 11 of the secondary battery 10, into which the electrolyte is injected. Then, the first and second conductors 120 and 130 arranged to be spaced apart from each other on the contamination detection plate 110 are in close contact with the surface of the pouch 11.

Figure 5:
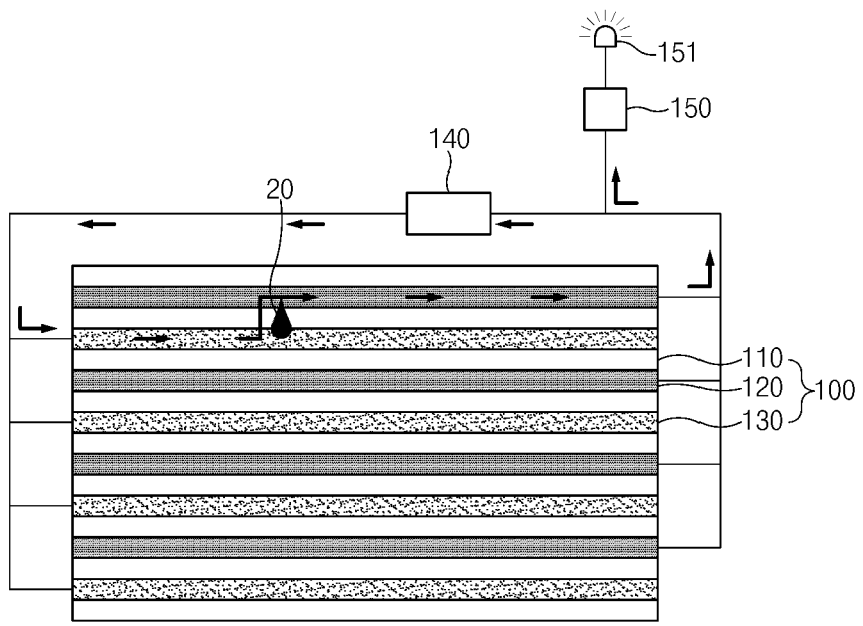
FIG. 5 is a front view illustrating an operation state of the electrolyte detection device according to the first embodiment of the present invention.

Here, when the electrolyte 20 is stained on the outside of the pouch 11, as illustrated in FIG. 5, the first and second conductors 120 and 130 are electrically connected to each other by the electrolyte 20 so that the current flows. As a result, the contamination detection member 150 operates by the current to generate a contamination occurrence signal.

Hereinafter, in descriptions of another embodiment of the present invention, constituents having the same function as the above-mentioned embodiment have been given the same reference numeral in the drawings, and thus duplicated description will be omitted.

Figure 6:
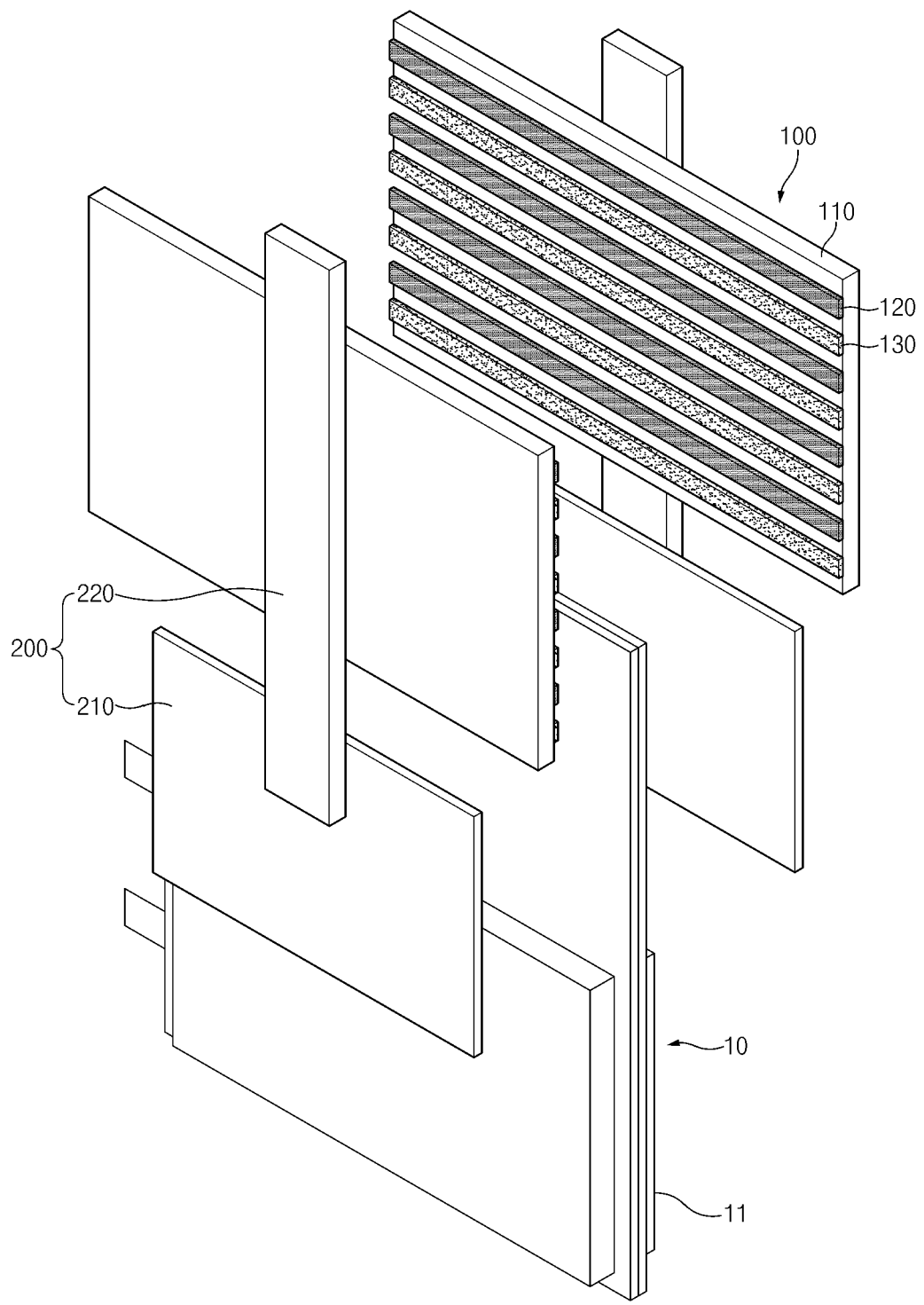
FIG. 6 is a perspective view of a secondary battery transfer facility according to a second embodiment of the present invention.
Figure 7:
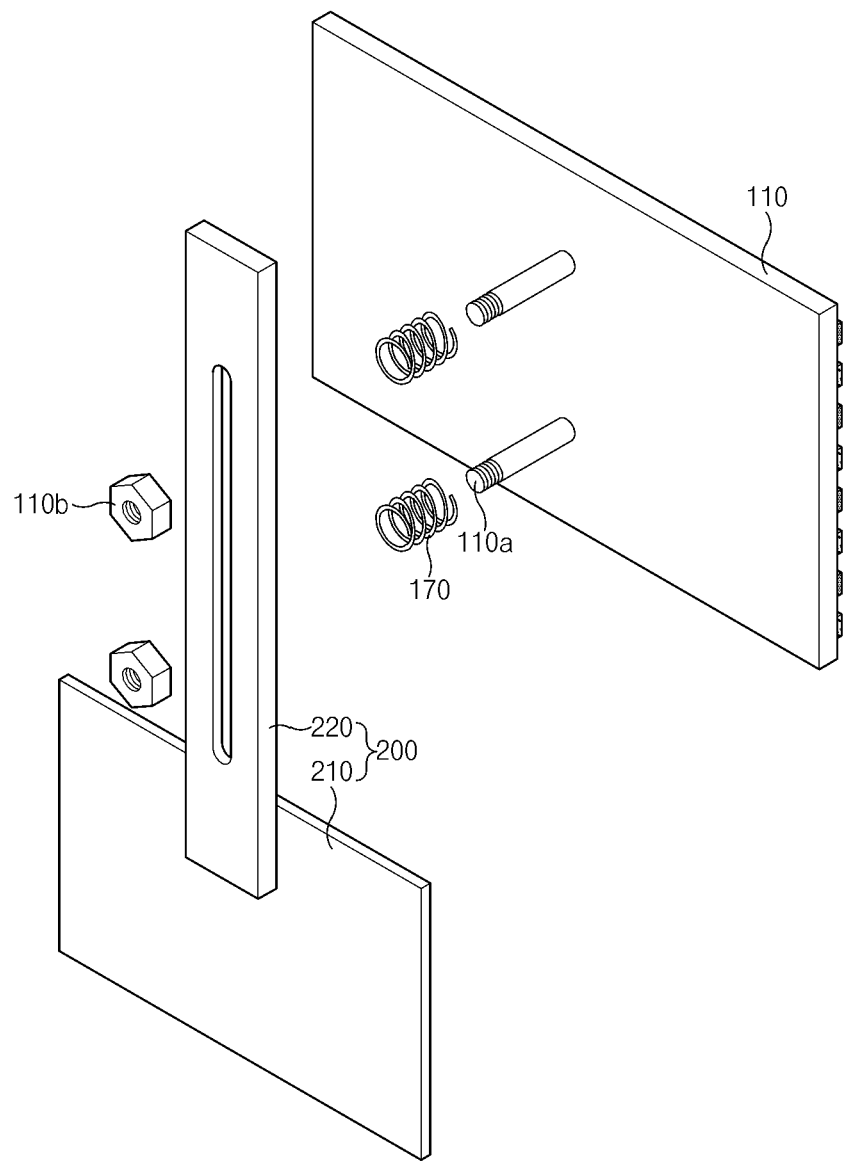
FIG. 7 is a perspective view illustrating another example of the secondary battery transfer facility according to the second embodiment of the present invention.
Figure 8:
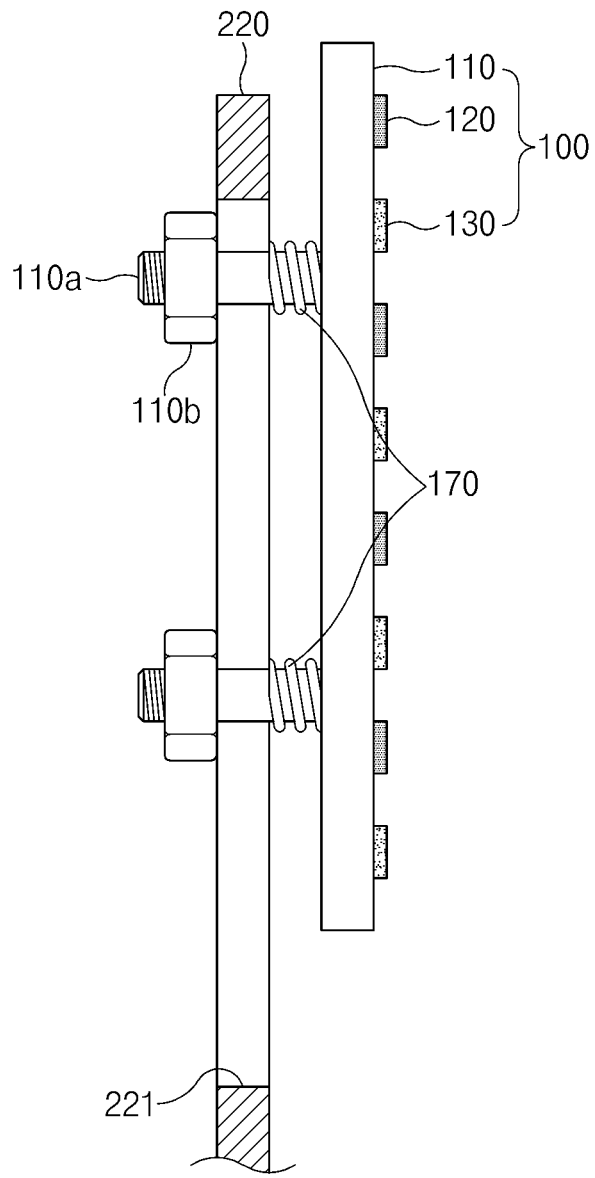
FIG. 8 is a cross-sectional view of FIG. 7.

Secondary Battery Transfer Facility According to Second Embodiment of the Present Invention As illustrated in FIGS. 6 to 8, a secondary battery transfer facility according to a second embodiment of the present invention comprises a gripper 200 comprising a gripping part 210 gripping both surfaces of a secondary battery 10 having an opening that is opened upward and a moving part 220 allowing the gripping part 210 gripping the secondary battery 10 to move to a set position, and an electrolyte detection device 100 installed on the moving part 220 corresponding to an upper portion of the secondary battery 10 to detect an electrolyte leaking from the opening of the secondary battery 10.

Here, the electrolyte detection device 100 comprises a contamination detection plate 110 installed on the moving part 220 to contact one outer surface of the secondary battery 10, first and second conductors 120 and 130 which are provided to be spaced apart from each other so that current does not flow on a surface of the contamination plate 110 and are electrically connected to each other by the electrolyte leaking from the opening of the secondary battery 10, a power member 140 comprising a positive electrode connected to the first conductor 120 and a negative electrode connected to the second conductor 130, and a contamination detection member 150 detecting whether the electrolyte leaks through the current generated when the first conductor 120 and the second conductor 130 are electrically connected to each other.

The electrolyte detection device 100 has the same constituent and function as the electrolyte detection device according to the foregoing first embodiment, and thus, a duplicated description thereof will be omitted.

Therefore, the secondary battery transfer facility according to the second embodiment of the present invention may detect whether the electrolyte is stained on the secondary battery while transferring the secondary battery 10 by using the gripper 200 to previously prevent secondary contamination due to the contaminated secondary battery from occurring.

As illustrated in FIGS. 7 and 8, the electrolyte detection device 100 is installed on the moving part 220 so as to be adjustable in position on the moving part 220 by an adjustment unit in a direction toward or opposite to the opening of the secondary battery 10.

That is, the adjustment unit comprises a guide hole 221 formed in the moving part in the direction toward the opening toward or opposite to the opening of the secondary battery 10, a bolt 110a disposed on the contamination detection plate 110 of the electrolyte detection device 100 to pass through the guide hole 221 so as to move along the guide hole 221 in the direction toward or opposite to the opening of the secondary battery 10, and a nut that is screw-coupled to the bolt 110a passing through the guide hole 221 to fix the electrolyte detection device 100 to the moving part 220.

An elastic member 170 having elastic restoring force to allow the contamination detection plate to elastically contact the secondary battery may be further provided between the moving part and the contamination detection plate. The elastic member 170 may be provided as a spring to provide elastic force to the contamination detection plate so that the contamination detection plate elastically contacts a surface of the secondary battery, thereby preventing the secondary battery from being damaged.

As described above, the electrolyte detection device 100 may be fixed to be adjustable in position on the moving part 220 through the adjustment unit. Therefore, the position of the electrolyte detection device 100 may be adjusted according to a size of the secondary battery 10 gripped by the gripper 200 to stably detect the electrolyte leaking out of the secondary battery. Therefore, the electrolyte detection device may be interchangeably used for the secondary battery having the various sizes.

Figure 9:
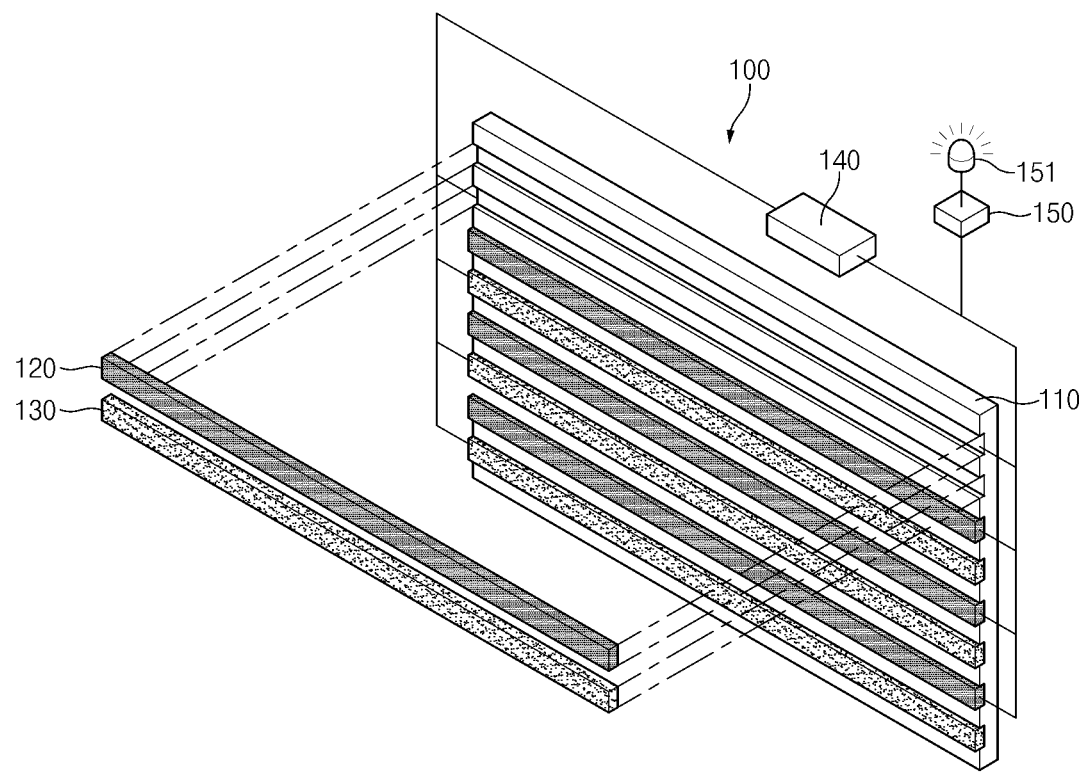
FIG. 9 is a perspective view of an electrolyte detection device according to a third embodiment of the present invention.

Electrolyte Detection Device According to Third Embodiment of the Present Invention As illustrated in FIG. 9, an electrolyte detection device according to a third embodiment of the present invention comprises a contamination detection plate 110, a first conductor 120, and a second conductor 130. The first conductor 120 and the second conductor 130 are alternately inserted into a plurality of insertion grooves 111 provided in a surface of the contamination detection plate 110.

That is, the insertion grooves are provided at regular intervals from an upper end to a lower end of the contamination detection plate 110 in which an opening of the secondary battery is disposed. The first conductor 120 and the second conductor 130 are alternately inserted into the insertion grooves 111, which are provided at regular intervals.

Thus, the electrolyte detection device according to the third embodiment of the present invention may stably fix the first conductor 120 and the second conductor 130 to the contamination detection plate 110.

Particularly, the first conductor 120 and the second conductor 130 may be detachably coupled to the insertion grooves 111 to improve efficiency of maintenance.

Figure 10:
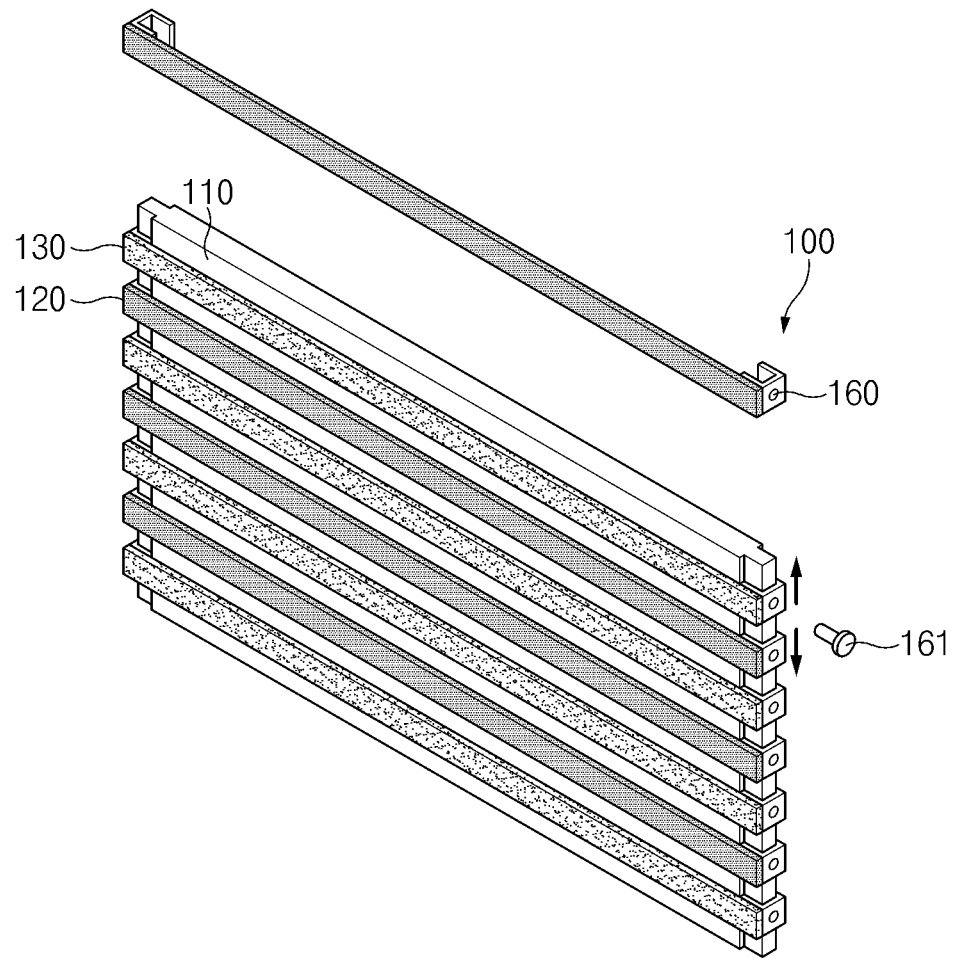
FIG. 10 is a perspective view of an electrolyte detection device according to a fourth embodiment of the present invention.
Figure 11:
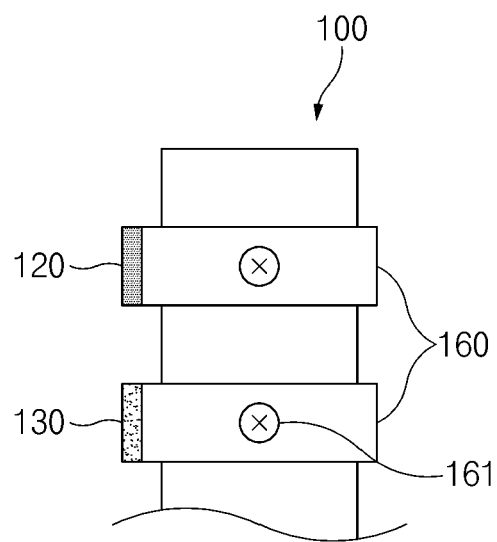
FIG. 11 is a side view of FIG. 10.

Electrolyte Detection Device According to Fourth Embodiment of the Present Invention As illustrated in FIGS. 10 and 11, an electrolyte detection device according to a fourth embodiment of the present invention comprises a contamination detection plate 110, a first conductor 120, and a second conductor 130 and further comprises an adjustment member 160 that allows the first conductor 120 and the second conductor 130, which are disposed on the contamination detection plate 110, to move in a direction toward or opposite to an opening of a secondary battery 10, thereby adjusting a position of the electrolyte detection device.

That is, the adjustment member 160 has one end installed on a side surface of the contamination detection plate 110 so as to be movable in the direction toward or opposite to the opening of the secondary battery 10 and the other end fixed to the first conductor 120 and the second conductor 130.

Thus, in the electrolyte detection device according to the fourth embodiment of the present invention, when the adjustment member 160 ascends or descends along the contamination detection plate 110, the first conductor 120 or the second conductor 130 may ascend or descend by being interlocked with the adjustment member 160. Therefore, the positions of the first conductor 120 and the second conductor 130 may be adjusted in the direction toward or opposite to the opening of the secondary battery 10.

The electrolyte detection device may further comprise a fixing bolt 161 fixing the adjustment member 160, which is fixed in position, to the contamination detection plate 110. Thus, the adjustment member 160 may be fixed to the contamination detection plate 110 through the fixing bolt 161 without moving.

Figure 12:
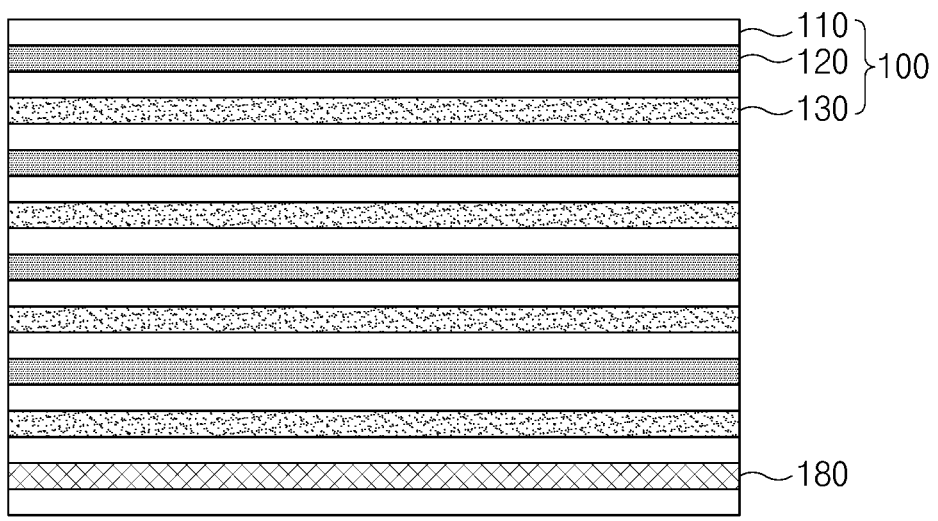
FIG. 12 is a front view of an electrolyte detection device according to a fifth embodiment of the present invention.

Electrolyte Detection Device According to Fifth Embodiment of the Present Invention As illustrated in FIG. 12, an electrolyte detection device according to a fifth embodiment of the present invention comprises a contamination detection plate 110, a first conductor 120, and a second conductor 130 and further comprises an absorption member 180, which absorbs an electrolyte leaking from an opening of a secondary battery 10, at a lower end of a surface of the contamination detection plate 110. That is, the absorption member 180 may absorbs the electrolyte leaking out of the secondary battery 10 to prevent the electrolyte from passing between the secondary battery 10 and the electrolyte detection device 100, thereby preventing secondary contamination due to the electrolyte from occurring.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

100: Electrolyte detection device
110: Contamination detection plate
111: Insertion groove
112: Accommodation space
120: First conductor
130: Second conductor
140: Power member
150: Contamination detection member
151: Lamp
160: Adjustment member
170: Elastic member
180: Absorption member
200: Gripper
210: Gripping part
220: Moving part

The invention claimed is:

1. An electrolyte detection device comprising:
a contamination detection plate configured to physically contact a first surface of a secondary battery, the secondary battery having an opening provided therein;
first and second conductors provided on the contamination detection plate and spaced apart from each other along a surface of the contamination detection plate, the first and second conductors configured to be electrically connected to each other by an electrolyte leaking from the opening of the secondary battery,
the first conductor having a plurality of first conductor portions and the second conductor having a plurality of second conductor portions, the plurality of first conductor portions and the plurality of second conductor portions being alternately arranged and spaced apart from each other in a vertical direction of the contamination connection plate,
first and second opposite ends of each of the first conductor portions and each of the second conductor portions are adjacent to respective first and second opposite ends of the contamination detection plate,
the first conductor portions are each spaced apart from adjacent ones of the second conductor portions in the vertical direction by an interval of 2 mm to 5 mm;
a power member comprising a positive electrode connected to the first conductor and a negative electrode connected to the second conductor; and
a contamination detection member configured to detect whether the electrolyte leaks onto the first surface of the secondary battery by detecting a current generated when the first conductor and the second conductor are electrically connected to each other by the electrolyte.

2. The electrolyte detection device of claim 1, wherein the contamination detection plate is made of a material having no liquid absorption capability and having electrical non-conductivity.

3. The electrolyte detection device of claim 1, wherein the first conductor and the second conductor are inserted into respective ones of a plurality of insertion grooves extending into the surface of the contamination detection plate.

4. The electrolyte detection device of claim 3, wherein outward facing surfaces of the first conductor and the second conductor are coplanar with the surface of the contamination detection plate.

5. The electrolyte detection device of claim 1, wherein the contamination detection member comprises a lamp configured to generate light using the current generated when the first conductor and the second conductor are electrically connected to each other.

6. An electrolyte detection device, comprising:
a contamination detection plate configured to physically contact a first surface of a secondary battery, the secondary battery having an opening provided therein;
first and second conductors provided on the contamination detection plate spaced apart from each other so that current does not flow on a surface of the contamination detection plate, the first and second conductors configured to be electrically connected to each other by an electrolyte leaking from the opening of the secondary battery;
a power member comprising a positive electrode connected to the first conductor and a negative electrode connected to the second conductor;
a contamination detection member configured to detect whether the electrolyte leaks onto the first surface of the secondary battery by detecting a current generated when the first conductor and the second conductor are electrically connected to each other by the electrolyte; and
an adjustment member configured to move the first conductor and the second conductor toward or away from the opening.

7. The electrolyte detection device of claim 6, wherein the adjustment member comprises first and second adjustment members disposed on each of the first conductor and the second conductor, respectively, the first and second adjustment members being disposed on a side surface of the contamination detection plate so as to be movable toward or away from the opening, thereby moving the first conductor and the second conductor toward or away from the opening, respectively.

8. The electrolyte detection device of claim 1, further comprising an absorption member configured to absorb the electrolyte at a lower end of the surface of the contamination detection plate.

9. A secondary battery transfer facility comprising:
a gripper comprising a gripping part configured to grip first and second opposite surfaces of a secondary battery having an opening in an upper portion thereof and a moving part configured to move the gripping part to a predetermined position; and
an electrolyte detection device installed on the moving part adjacent to an upper portion of the secondary battery, the electrolyte detection device being configured to detect an electrolyte leaking from the opening of the secondary battery,
wherein the electrolyte detection device comprises:
a contamination detection plate installed on the moving part and configured to physically contact a first surface of a secondary battery, the secondary battery having an opening provided therein;
first and second conductors provided on the contamination detection plate spaced apart from each other so that current does not flow on a surface of the contamination detection plate, the first and second conductors configured to be electrically connected to each other by the electrolyte leaking from the opening of the secondary battery;
a power member comprising a positive electrode connected to the first conductor and a negative electrode connected to the second conductor; and
a contamination detection member configured to detect whether the electrolyte leaks onto the first surface of the secondary battery by detecting a current generated when the first conductor and the second conductor are electrically connected to each other by the electrolyte.

10. The secondary battery transfer facility of claim 9, wherein the moving part is adjustable in position, thereby permitting the electrolyte detection device to be moved in a direction toward or away from the opening of the moving part.

11. The secondary battery transfer facility of claim 9, further comprising an elastic member having an elastic restoring force and being disposed between the moving part and the contamination detection plate, so that the contamination detection plate is configured to elastically contact the secondary battery.

12. The secondary battery transfer facility of claim 11, wherein the elastic member comprises a spring.

* * * * *